Aug. 7, 1956      W. E. RANEY      2,757,642
REVERSING VALVE FOR CYLINDERS AND THE LIKE
Filed March 2, 1953
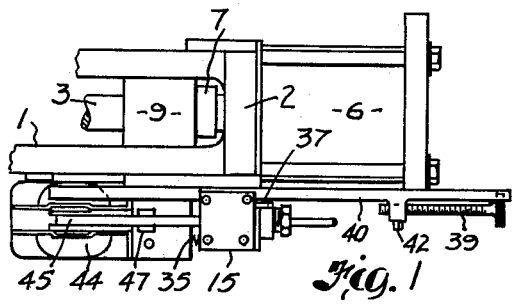
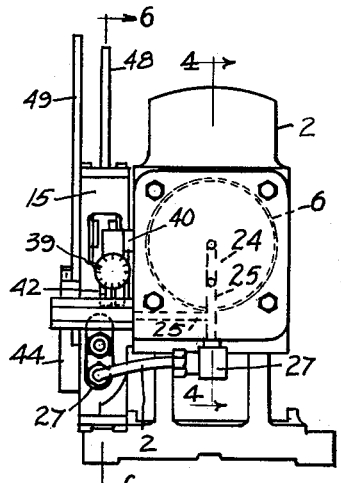
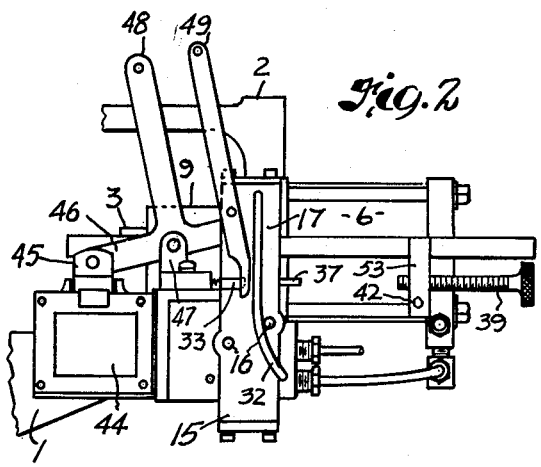
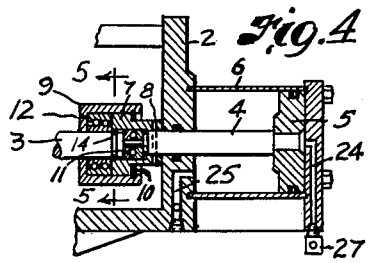
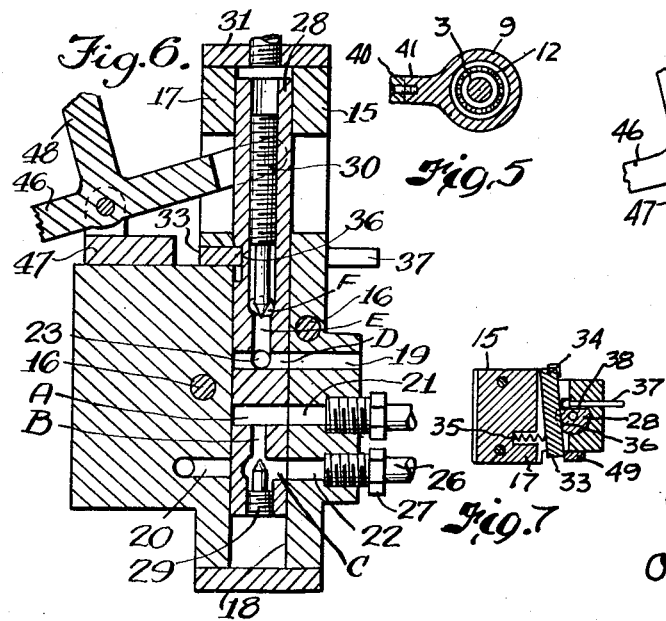
INVENTOR.
WILLIAM E. RANEY
BY
Oberlin & Limbach
ATTORNEYS.

United States Patent Office 2,757,642
Patented Aug. 7, 1956

2,757,642

REVERSING VALVE FOR CYLINDERS AND THE LIKE

William E. Raney, Rocky River, Ohio

Application March 2, 1953, Serial No. 339,876

2 Claims. (Cl. 121—46.5)

This application is a continuation-in-part of my copending application Serial No. 88,456, filed April 19, 1949, now Patent No. 2,648,238, granted August 11, 1953.

The present invention relates generally as indicated to a reversing valve for cylinders and the like, and more particularly for the cylinders of tool actuating mechanisms of the character disclosed and claimed in my aforesaid application Serial No. 88,456.

It is one object of this invention to provide a fluid power control system unit for such apparatus including a quick-acting reversing and throttling valve of fool-proof construction and having a unique latch mechanism associated therewith which is arranged to be tripped to effect a quick reversal of said valve and thus of the cylinder or like fluid pressure actuated device.

Another object of this invention is to provide a valve of the character indicated which is capable of controlling not only the distance of travel of a piston of a cylinder but, in addition, the speed of travel.

Another object of this invention is to provide a valve of the character indicated which may be readily connected with a cylinder in such a way that the piston therein will be contuously reciprocated so long as desired.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a top plan view of the rear portion of the apparatus with which my quick acting reversing and throttling valve is associated;

Fig. 2 is a side elevation view of the rear portion of the apparatus;

Fig. 3 is a rear elevation view as viewed from the right-hand end of Fig. 1;

Fig. 4 is a cross-sectional view taken substantially along the line 4—4, Fig. 3;

Fig. 5 is a transverse cross-section view of the apparatus taken substantially along the line 5—5, Fig. 4;

Fig. 6 is a cross-section view of the present reversing and throttling valve taken substantially along the line 6—6, Fig. 3;

Fig. 7 is a cross-section view taken substantially along the line 7—7, Fig. 6, illustrating the latching mechanism on said valve; and Fig. 8 is a side elevation view of the valve, partly in section, showing a modification.

Referring now to the drawings, there is shown therein a main frame structure 1 providing a housing 2 at the rear portion thereof containing various operating and control units which are hereinafter described in detail.

A rotatably and/or axially reciprocably supported shaft 3 extends into housing 2 and is axially fixedly connected to the piston rod portion 4 of a piston 5 which is reciprocable in a cylinder 6 attached to said housing. If shaft 3 is rotatable, the rotatable connection between said rod 4 and drive shaft 3 comprises, for example, a swivel coupling including a collar member 7 attached to the piston rod 4 as by means of a pin 8, and a sleeve member 9 surrounding said collar and axially fixed thereonto as by a snap ring 10, said members forming a chamber between the opposed ends of the drive shaft 3 and the piston rod 4 in which is disposed an axial thrust bearing 11 and also forming a second chamber around said drive shaft 3 in which is disposed a radial thrust bearing 12. Said drive shaft is axially fixed to said swivel coupling so that the piston rod 4 and drive shaft 3 will always move together axially as by means of a snap ring 14 on said shaft engaging the rear face of the inner race of bearing 12. Thus, it is apparent that any axial movement of the piston 5 in said cylinder 6 will effect a corresponding axial movement of said drive shaft 3.

The pneumatic valve 15 which controls the supply of air under pressure alternately to opposite ends of cylinder 6 (to thus control the reciprocation of the piston 5 therein) is mounted on one side of housing 2 as by screws 16 and comprises as best shown in Fig. 6 a body 17 formed with a bore 18 therethrough intersected by a plurality of axially spaced lateral ports of which the ports 19 and 20 are exhaust ports, the port 21 is an air pressure inlet port, and the ports 22 and 23 in said body 17 respectively communicate with the passages 24 and 25 at the opposite ends of cylinder 6, the former being connected to the passage 24 at the head end of said cylinder by means of a length of tube 26 connected to valve body 17 and cylinder 6 as by conventional fittings 27 and the latter port 23 registering with the passage 25 at the rod end of said cylinder.

Reciprocable within said valve body bore 18 is a valve plunger or spool member 28 provided with several ports disposed radially and axially thereof and arranged so that in one position of said plunger, viz. that shown in Fig. 6, air from the inlet port 21 will flow through the plunger ports A, B, C to the body port 22 and through the tube 26 to the head end of cylinder 6 and the air from the rod end of said cylinder will flow through the port 23 in the body and thence through a port D in said plunger and out through the exhaust port 19 in said body. A needle valve 29 is mounted in port B of said plunger 28 and is adjustable so as to desirably control the rate of flow of air into the head end of cylinder 6 and thereby control the left or in-feed of the drive shaft 3.

In the other position of said plunger 28, viz. the plunger moved downward from the position shown in Fig. 6, air under pressure in the inlet port 21 flows through ports D, E, F in the plunger to the port 23 in the valve body then in register with port F and into the passage 25 leading into the rod end of cylinder 6 and the exhaust from the head end of said cylinder flows through tube 26, port 22 in the body, and port A in said plunger, and will be exhausted through the port 20 in the body. Another needle valve 30 is adjustably threaded into said plunger to control flow through port E in said plunger to effect any desired rate of right or out-feed movement of piston 5 and drive shaft 3.

In order to attain rapid reversal of said valve 15 and thereby attain accurate limiting of the in-feed movement of the drive shaft 3, the upper end of the bore 18 in said valve body 17 is closed as by a cap 31 to form a pressure chamber with the upper end of the plunger 28, air under pressure being supplied to such chamber from the port 22 by way of the tube 32 or a hole in the body (see Fig. 2) during the entire left in-feed movement of piston 5 and drive shaft 3 whereupon the tripping of the latch mechanism now to be described will effect sure and rapid downward movement of said plunger 28 to direct air pressure to the rod end of cylinder 6 to promptly commence the out-feed movement.

Said latch mechanism comprises a latch member 33 pivotally connected as at 34, Fig. 7, to valve body 17 and normally urged by a spring 35 engaging the outer end portion of said latch member 33 into engagement with a transverse notch 36 formed in the side of said plunger 28. Said latch member 33 is adapted to be shifted out of engagement with such notch 36, to permit air under pressure acting on the top of the plunger to urge the plunger downwardly, by means of a pin 37 which is slidably mounted in body 17 and which projects laterally therefrom, said pin preferably being disposed alongside a flattened portion 38 of the plunger for permitting axial movement of the plunger and precluding rotation thereof in the valve body.

Actuation of said pin 37 is effected by engagement therewith by the adjusting screw 39 which is threaded into a slide bar 40 mounted for movement along a path parallel to the axis of drive shaft 3 and so moved by reason of the inner end of said bar being connected to a lug 41 formed on the sleeve member 9 (see Fig. 5). Said body 17 is formed with a slot in which the bar 40 is slide-guided. The outer face of said adjusting screw 39 is provided with circumferentially spaced calibrations as shown which register with the lower edge of said slide bar 40 so that the position of the end of screw 39 relative to the end of pin 37 may be accurately set. If desired, said slide bar 40 may, in addition, be provided with a scale therealong to indicate the distance between the end of the pin 37 and the end of the screw 39. Locking of screw 39 in adjusted position is effected as by tightening of screw 42 which draws together the legs of the split arm 43 into frictional engagement with said screw 39.

As now apparent, the in-feed movement of drive shaft 3 will be interrupted upon the engagement of screw 39 with pin 37 and the consequent disengagement of latch member 33 from notch 36 in plunger 28 whereupon said plunger will immediately be shifted to a position switching the air pressure from the head end of cylinder 6 to the rod end and thereby commence the out-feed movement of said drive shaft 3.

Resetting of plunger 28 for effecting subsequent in-feed movement is effected by energizing a solenoid 44 which has its core or plunger 45 connected to one end of a lever 46 which is pivotally connected between its ends to a bracket 47 on valve body 17 and which has its other end engaging the valve plunger 28. Said lever 46 is further provided with an arm 48 which enables manual resetting as by suitable linkage mechanism (not shown) or automatic resetting as by a cam (not shown) carried by the slide bar 40 or drive shaft 3. Release of the latch member 33 may also be effected by a lever 49 pivotally mounted on valve body 17 and engaged with the free end of said latch member.

As apparent, the solenoid 44 may be automatically energized at any stage of the outfeed movement or at the end of the stroke of piston 5 as by means of a switch (not shown) actuated by a cam or the like on any part of the reciprocating assembly as for example, a cam on the drive shaft 3, the coupling member 20, the slide bar 50, or the piston 5. Automatic operation may also be effected through mechanical linkage (not shown) which interconnects the reciprocating assembly to the arm 48. In any event, the present valve 15 can effect continuous reciprocation of the reciprocating assembly until the air pressure is shut off, or until the electric power to solenoid 44 is disconnected, or until the linkage between arm 54 and the reciprocating assembly is disconnected.

Having thus described one embodiment of this invention, reference will now be made to the general operation thereof.

With the needle valves 29 and 30 predeterminately adjusted, with the plunger 28 in its lower position in valve body 17 and with the adjusting screw 39 desirably set, air under pressure at port 21 of valve 15 will hold the drive shaft 3 in a retracted position. By energizing the solenoid 44, the plunger 28 will be raised and thereby latched to direct air under pressure to the head end of cylinder 6 at a desired rate through the needle valve 29. During the initial portion of the in-feed movement, the controlled air flow into the head end of cylinder 6 will desirably retard such movement. The in-feed movement continues to a definite point as determined by the engagement of the screw 39 on slide bar 40 with pin 37, which pin when moved disengages the latch member 33 from the valve plunger 28.

With the latch mechanism so released, air pressure on the top end of plunger 28 rapidly forces the plunger downwardly to reverse the air pressure in cylinder 6 to thus commence the out-feed movement. At this time, the out-feed movement occurs with desired rapidity and sureness by the effect of the compressed air in said cylinder 6. The speed of out-feed is controlled by the needle valve 30 which regulates the air flow to the rod end of cylinder 6. The apparatus is retained in a retracted position and the plunger 28 is again raised and latched by the energization of the solenoid 44 or by the operation of lever 48. As previously indicated, the valve plunger 28 may be released from latched position by operating lever 49 instead of pin 37.

The form of valve 15 illustrated in Fig. 8 is substantially the same as that of Fig. 7 except that a spring 50 urges the plunger 28 downwardly to flow reversing position upon release of latch 33. Accordingly, the conduit 32 (see Fig. 2) for supplying air pressure to the top of plunger 28 may be omitted unless, of course, it be desired to employ both air pressure and spring pressure for shifting said plunger 28 downwardly.

Other modes of applying the principle of the invention may be employed, change being made as regards the details described, provided the features stated in any of the following claims, or the equivalent of such, be employed.

I, therefore, particularly point out and distinctly claim as my invention:

1. A control valve comprising a body formed with a bore and a plurality of ports, viz. an inlet port for connection with a source of fluid under pressure, a pair of cylinder ports for connection to the opposite ends of an actuating cylinder, and a pair of exhaust ports, all leading to such bore at axially spaced intervals therealong; a valve member axially slidable in such bore and provided with passages which in two different axial positions of said valve member in such bore alternately communicate the inlet port with one cylinder port, and a exhaust port with the other cylinder port; and a pair of throttle valves in said valve member for adjustably throttling the flow of fluid from such inlet port to the cylinder port in communication therewith while the other cylinder port is communicated, without throttling, with an exhaust port.

2. A control valve comprising a body formed with a cylindrical bore and a plurality of ports, viz. an inlet port for connection with a source of fluid under pressure, a pair of cylinder ports for connection to the opposite ends of an actuating cylinder, and a pair of exhaust ports, all intersecting such bore at axially and circumferentially spaced regions; a cylindrical valve member axially slidable in such bore and provided with passages which in two different axial positions of said valve member member in such bore alternately communicate the inlet port with one cylinder port, and an exhaust port with the other cylinder port; said valve member being formed with a transverse notch in its peripheral surface and with a flat surface parallel to the longitudinal axis thereof; a spring-actuated latch movably carried by said body for movement radially into and out of engagement with the notch in said valve member to respectively hold the latter in one axial position and to release the latter for axial movement to the other axial position; means constantly acting on said valve member tending to shift the latter from its said one axial position to said other axial position; and a latch-operating member movably carried by said body for engaging said latch to move the latter out of engagement with the notch in said valve member; said latch-operating member being disposed adjacent to such flat surface of said valve member to permit axial movement, without rotation, of said valve member in the bore of said body to thus maintain a predetermined circumferential disposition of the valve member passages and the body ports for alternate communication as aforesaid.

References Cited in the file of this patent

UNITED STATES PATENTS

| Number | Name | Date |
|---|---|---|
| 342,073 | Curtis | May 18, 1886 |
| 476,228 | Hamilton | May 31, 1892 |
| 719,109 | Hanson | Jan. 27, 1903 |
| 1,179,822 | Gransden | Apr. 18, 1916 |
| 1,298,227 | Landis | Mar. 25, 1919 |
| 1,750,684 | Oakley | Mar. 18, 1930 |
| 1,927,583 | Ernst | Sept. 19, 1933 |
| 2,067,492 | Kingsbury | Jan. 12, 1937 |
| 2,249,508 | Warner | July 15, 1941 |
| 2,265,260 | Argo | Dec. 9, 1941 |
| 2,603,192 | Kensok | July 15, 1952 |
| 2,605,751 | Perry | Aug. 5, 1952 |